(12) United States Patent
Lu

(10) Patent No.: US 7,975,304 B2
(45) Date of Patent: Jul. 5, 2011

(54) PORTABLE STORAGE DEVICE WITH STAND-ALONE ANTIVIRUS CAPABILITY

(75) Inventor: Chien-Chih Lu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1036 days.

(21) Appl. No.: 11/414,562

(22) Filed: Apr. 28, 2006

(65) Prior Publication Data

US 2007/0261118 A1    Nov. 8, 2007

(51) Int. Cl.
G08B 23/00 (2006.01)
(52) U.S. Cl. .......................... 726/24; 713/193
(58) Field of Classification Search .................... 726/24, 726/1, 20, 9, 21, 23, 25, 26, 22, 34; 711/173, 711/103, 115; 713/172, 182, 185, 193
See application file for complete search history.

(56) References Cited

U.S. PATENT DOCUMENTS

| | | | |
|---|---|---|---|
| 5,948,104 A * | 9/1999 | Gluck et al. ..................... | 726/24 |
| 6,016,553 A * | 1/2000 | Schneider et al. .............. | 714/21 |
| 6,035,423 A * | 3/2000 | Hodges et al. ................ | 714/38.1 |
| 6,128,734 A * | 10/2000 | Gross et al. ..................... | 713/100 |
| 6,170,055 B1 * | 1/2001 | Meyer et al. ....................... | 713/2 |
| 6,230,285 B1 * | 5/2001 | Sadowsky et al. .............. | 714/14 |
| 6,317,845 B1 * | 11/2001 | Meyer et al. .................... | 714/23 |
| 6,347,375 B1 | 2/2002 | Reinert et al. | |
| 7,020,895 B2 * | 3/2006 | Albrecht ......................... | 726/22 |
| 7,073,013 B2 * | 7/2006 | Lasser ........................... | 711/102 |
| 7,096,501 B2 * | 8/2006 | Kouznetsov et al. ........... | 726/24 |
| 7,127,531 B2 * | 10/2006 | Biggs et al. ....................... | 710/5 |
| 7,293,166 B2 | 11/2007 | Nguyen et al. | |
| 7,383,386 B1 * | 6/2008 | Iyer et al. ...................... | 711/115 |
| 7,392,542 B2 * | 6/2008 | Bucher ........................... | 726/22 |
| 7,591,018 B1 * | 9/2009 | Lee ................................. | 726/24 |
| 2001/0005889 A1 * | 6/2001 | Albrecht ........................ | 713/201 |
| 2002/0049883 A1 * | 4/2002 | Schneider et al. ............ | 711/100 |
| 2003/0221095 A1 * | 11/2003 | Gaunt et al. ..................... | 713/1 |
| 2004/0038592 A1 | 2/2004 | Yang | |
| 2004/0068662 A1 * | 4/2004 | Ho et al. ........................ | 713/200 |
| 2004/0095382 A1 * | 5/2004 | Fisher et al. .................. | 345/744 |

(Continued)

FOREIGN PATENT DOCUMENTS

WO    WO 2005109302    * 11/2005

OTHER PUBLICATIONS

USB Flash Drives, USB Memory and Portable Computer Hard Drive Information, Webpage [online] [Retrieved on Jul. 20, 2006] Retrieved from the Internet:<URL:http//www.usbflashdrive.org/usbfd_overview.html>.

(Continued)

Primary Examiner — Matthew B Smithers
Assistant Examiner — Abu Sholeman
(74) Attorney, Agent, or Firm — Okamoto & Benedicto LLP

(57) ABSTRACT

In one embodiment, a portable storage device includes a removable device interface and a non-volatile memory having a read-only partition and a regular storage partition. The read-only partition may include a protection program for scanning data in the regular storage partition for viruses. Upon connection of the portable storage device into a computer, the protection program may be read from the read-only partition for loading and running in the main memory of the computer. The protection program may be configured to stop running in the main memory upon removal of the portable storage device from the computer. The device interface may comprise the Universal Serial Bus (USB) interface, for example.

14 Claims, 4 Drawing Sheets

U.S. PATENT DOCUMENTS

| | | | |
|---|---|---|---|
| 2004/0117610 A1* | 6/2004 | Hensley | 713/2 |
| 2004/0148450 A1 | 7/2004 | Chen et al. | |
| 2004/0158699 A1* | 8/2004 | Rhoads et al. | 713/1 |
| 2004/0210645 A1* | 10/2004 | Kouznetsov et al. | 709/220 |
| 2004/0236874 A1* | 11/2004 | Largman et al. | 710/8 |
| 2005/0015540 A1 | 1/2005 | Tsai et al. | |
| 2005/0022014 A1* | 1/2005 | Shipman | 713/201 |
| 2005/0039076 A1* | 2/2005 | Shoam | 714/20 |
| 2005/0044400 A1* | 2/2005 | Li et al. | 713/200 |
| 2005/0102471 A1* | 5/2005 | Tsai et al. | 711/115 |
| 2005/0156037 A1* | 7/2005 | Wurzburg | 235/435 |
| 2005/0216759 A1* | 9/2005 | Rothman et al. | 713/200 |
| 2005/0278544 A1* | 12/2005 | Baxter | 713/182 |
| 2006/0015744 A1* | 1/2006 | Masuzawa et al. | 713/182 |
| 2006/0075486 A1* | 4/2006 | Lin et al. | 726/20 |
| 2006/0156405 A1* | 7/2006 | Forman et al. | 726/24 |
| 2007/0283444 A1* | 12/2007 | Jang | 726/26 |

OTHER PUBLICATIONS

The 1st Office Action for Chinese Patent Application No. 200610105401.9, issued Apr. 7, 2010 (15 pages).

* cited by examiner

PORTABLE STORAGE DEVICE WITH STAND-ALONE ANTIVIRUS CAPABILITY

BACKGROUND OF THE INVENTION

1. Field of the Invention

The present invention relates generally to computer systems, and more particularly but not exclusively to portable storage devices and antivirus programs.

2. Description of the Background Art

Computer viruses, worms, Trojans, and spyware are examples of malicious codes that have plagued computer systems throughout the world. Although there are technical differences between each type of malicious code, malicious codes are collectively referred to herein as "viruses." Likewise, programs that are designed to combat malicious codes are referred to herein as "antivirus." Antivirus programs are widely available from a variety of vendors including Trend Micro, Inc.

Although the threat posed by viruses is well known, some users still operate their computers with inadequate virus protection (e.g., out of date antivirus program) or even without any form of virus protection. The increased usage of portable storage devices exacerbates the situation by facilitating data transfer from one computer to another. For example, Universal Serial Bus (USB) flash memory devices, also referred to as a "USB stick," are commonly used to copy data from one computer for loading into another. If the USB stick has been inserted in even one computer that has no virus protection, the USB stick could potentially spread viruses to the other computers.

SUMMARY

In one embodiment, a portable storage device includes a removable device interface and a non-volatile memory having a read-only partition and a regular storage partition. The read-only partition may include a protection program for scanning data in the regular storage partition for viruses. Upon connection of the portable storage device into a computer, the protection program may be read from the read-only partition for loading and running in the main memory of the computer. The protection program may be configured to stop running in the main memory upon removal of the portable storage device from the computer. The device interface may comprise the Universal Serial Bus (USB) interface, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of portable USB storage devices for illustration purposes only. It is to be understood that embodiments of the present invention are equally applicable and beneficial to portable devices that plug into computer interfaces other than USB. "Portable storage device" means relatively small, removable data storage device typically employed with more than one computer and may be conveniently carried on one's person. Examples of portable storage devices include USB sticks and USB micro-drives. The below examples are described in the context of USB sticks but should be understood as equally applicable to USB micro-drives and other portable storage devices.

Figure 1:
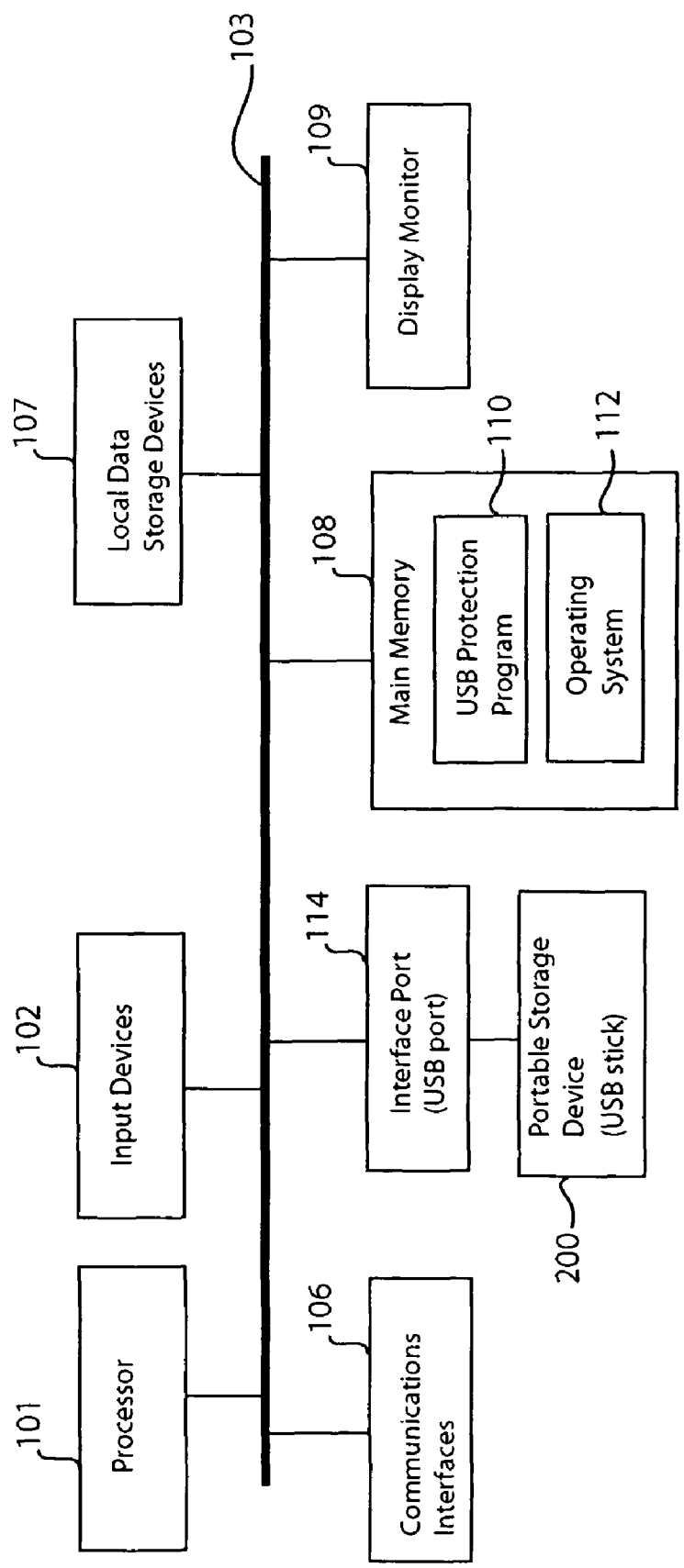
FIG. 1 shows a schematic diagram of an example computer that may be used with portable storage devices of the present invention.

Referring now to FIG. 1, there is shown a schematic diagram of an example computer that may be used with portable storage devices of the present invention. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more user input devices 102 (e.g., keyboard, mouse), a display monitor 109 (e.g., LCD, cathode ray tube, flat panel display), communications interfaces 106 (e.g., network adapters, modems) for communicating over computer networks (e.g., the Internet), one or more local data storage devices 107 (e.g., hard disk drive, optical drive), a main memory 108 (e.g., RAM), an interface port 114, and a portable storage device 200 pluggable to the port 114. In the example of FIG. 1, main memory 108 includes a protection program 110 and an operating system 112. Main memory 108 may also include other programs not specifically shown. Programs in main memory 108 may be executed by the processor 101. In the following examples, the port 114 comprises a USB port, while the portable storage device 200 comprises a USB stick. In one embodiment, the operating system 112 comprises the Microsoft Windows™ operating system.

Figure 2A:
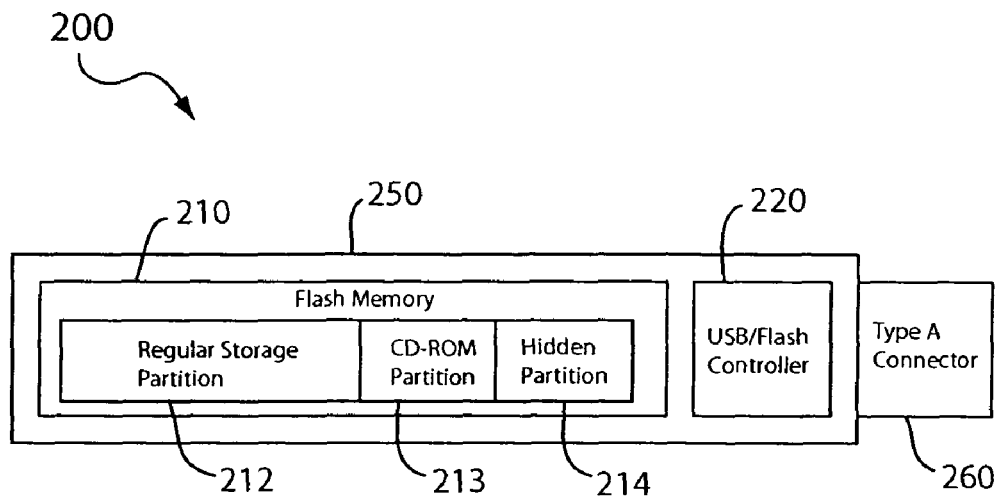
FIG. 2A schematically shows a portable USB storage device in accordance with an embodiment of the present invention.

FIG. 2A schematically shows a portable USB storage device 200 in accordance with an embodiment of the present invention. In the example of FIG. 2A, the storage device 200 comprises a USB stick with a solid state memory in the form of a flash memory 210 and a device controller in the form of a USB/flash controller 220. The memory 210 and the controller 220 are in a housing 250. A type-A male USB connector 260 allows the storage device 200 to be plugged into a USB port (e.g., see interface port 114 of FIG. 1). The flash memory 210 provides non-volatile data storage. The controller 220 is coupled to the flash memory 210 and provides an interface to a computer to allow the computer to access the flash memory 210.

Figure 2B:
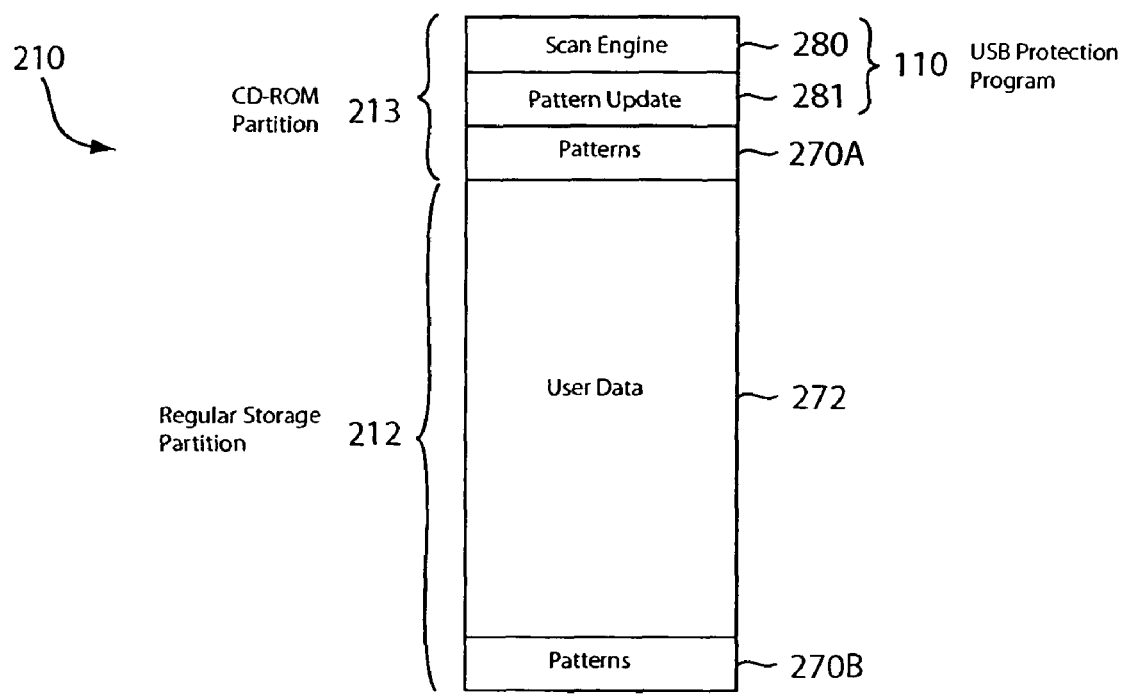
FIG. 2B schematically shows further details of the flash memory of the portable USB storage device of FIG. 2A, in accordance with an embodiment of the present invention.

In the example of FIG. 2A, the flash memory 210 has several partitions including a regular storage partition 212 and a read-only partition in the form of CD-ROM partition 213. Optionally, the flash memory 210 may also include a hidden partition 214. The hidden partition 214 may allow for storage of software components desirable to be hidden from user view or manipulation. The hidden partition 214 may include hidden directories for pattern files, for example. As will be more apparent below, the operating system sees and treats the CD-ROM partition 213 as a "CD-ROM drive," and the regular storage partition 212 as a "USB flash storage drive." FIG. 2B schematically shows further details of the flash memory 210 in accordance with an embodiment of the present invention. In the example of FIG. 2B, the CD-ROM partition 213 includes a USB protection program 110 and patterns 270A. The protection program 110 may comprise computer-readable program code for protecting the storage device 210 from viruses. In one embodiment, the protection program 110 includes a scan engine 280 and a pattern update manager 281. The scan engine 280 may comprise computer-readable program code for scanning data in the regular storage partition 212 (and other portions of the flash memory 210, if desired) for viruses. To check for viruses, the scan engine 280 may compare the contents of the data being scanned against virus patterns (also known as "signatures") contained in the patterns 270A or 270B, whichever are more up to date. Patterns 270 (i.e., 270A, 270B) may include version tracking information that can be compared to determine which one is more recent. Note that the mechanics of virus scanning, in general, is well known and thus not repeated here. The scan engine 280 may employ any suitable conventional virus scanning algorithm and associated virus patterns without detracting from the merits of the present invention.

The pattern update manager 281 may comprise computer-readable program code for obtaining the most up to date patterns 270 for use by the scan engine 280. In one embodiment, the pattern update manager 281 searches the local storage of the host computer to which the storage device 200 is plugged for compatible patterns 270. This is the case when the host computer employs an antivirus from the same vendor as that of the storage device 200. Depending on implementation, the pattern update manager 281 may also try to obtain the most up to date patterns 270 from a support server over the Internet, for example. The pattern update manager 281 may store in the regular storage partition 212 the most up to date patterns 270 it can find. As previously noted, the CD-ROM partition 213 comes from the factory pre-loaded with the patterns 270A, which may be used in cases where more recent patterns 270 cannot be found.

In one embodiment, the protection program 110 is an executable file that is automatically run by the operating system 112 (see FIG. 1; e.g., Microsoft Windows™ operating system) upon insertion of the storage device 200 into the port 114. The protection program 110 is loaded from the CD-ROM partition 213 to the memory 108 (see FIG. 1) of the host computer. Because the storage device 200 is likely temporarily plugged to the host computer, the protection program 110 runs on the memory 108 but preferably does not copy components of the protection program 110 into local data storage devices (e.g., local data storage device 107 of FIG. 1). This minimizes the impact of the protection program 110 to the portability of the storage device 200 and its use with several, differently owned or operated computers. For similar reasons, the protection program 110 preferably does not involve components requiring reboot of the host computer. The protection program 110 thus allows for virus scanning of data stored in the regular storage partition 212 (and other portions of the flash memory 210, if desired) without requiring the host computer to have an antivirus and without making intrusive changes to the host computer.

The CD-ROM partition 213 is a read-only partition to prevent users from altering the protection program 110 and the patterns 270A. The CD-ROM partition 213 emulates a CD-ROM and thus appears as a CD-ROM drive to the operating system of the host computer. That is, when plugged into a host computer, the CD-ROM partition will appear as a separate logical drive and function as if it was a CD-ROM drive. The contents of the CD-ROM partition may be formed in the factory, during the manufacture of the storage device 200. The storage device 200 may be fabricated according to the present disclosure by commercial USB device manufacturers, such as Everlasting Technology (ShenZhen) Co., Ltd of China (Internet URL <http://www.starit.cn>). The CD-ROM partition 213 not only provides a read-only partition for storing critical software components, but also advantageously allows computers with an auto-run feature to automatically launch components stored in the CD-ROM partition 213.

As shown in FIG. 2B, the regular partition 212 includes the user data 272 and the patterns 270B. The user data 272 may comprise computer-readable data including music, video, computer programs, files, and so on. The patterns 270B are shown as being in the regular storage partition 212 in the embodiment where a hidden portion 214 is not implemented. The patterns 270B are preferably in a hidden partition 214, if available, to prevent users from altering the patterns 270B.

Figure 3:
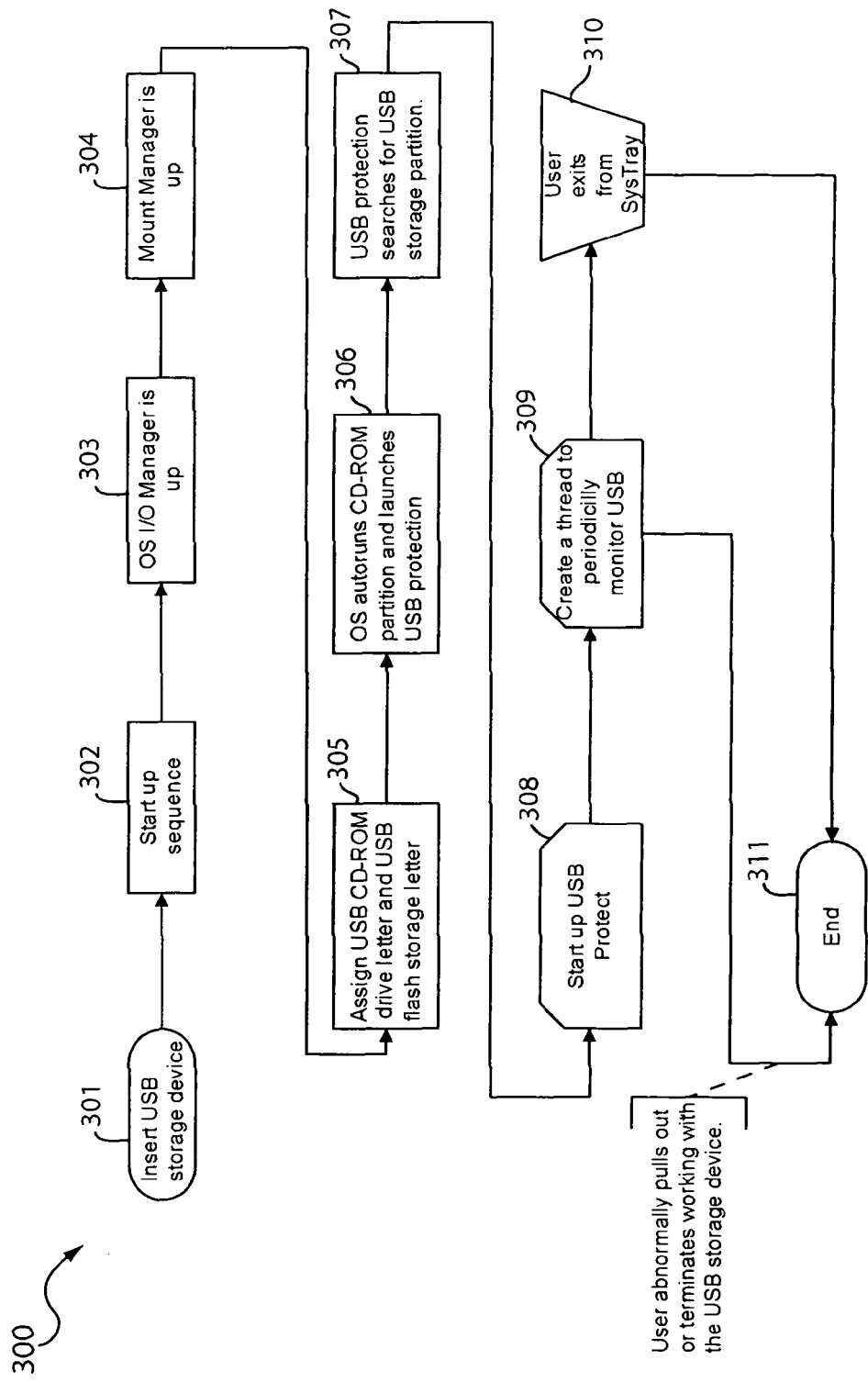
FIG. 3 shows a flow diagram illustrating the use and operation of the portable USB storage device of FIG. 2A in accordance with an embodiment of the present invention.

Referring now to FIG. 3, there is shown a flow diagram 300 illustrating the use and operation of the portable USB storage device 200 in accordance with an embodiment of the present invention. A user inserts the storage device 200 to a USB port 114 of the host computer (see FIG. 1) to begin use of the storage device (301). The insertion of the storage device 200 into the port 114 is detected by drivers or components of the operating system 112, which begins a start up sequence for the storage device 200 (302). At some time later, the 1/0 manager of the operating system will come up (303) and the mount manager for mounting the CD-ROM partition 213 and the rest of the flash memory 210 will also come up (304). The CD-ROM partition 213 and the regular storage partition 212 will be mounted as separate logical drives and assigned separate drive letters (305).

If its auto-run feature is enabled, the operating system automatically runs the CD-ROM partition 213 to launch the protection program 110 (306). The user may manually invoke the protection program 110 if auto-run is disabled. The protection program 110 is loaded and runs in memory 108. The protection program 110 searches and finds the assigned logical drive for the regular storage partition 212 (307). The start up of protection program 110 (308) results in the creation of one or more threads (i.e., processes, tasks, etc.) for protecting the storage device 200 from viruses. Advantageously, these tasks do not necessarily require reboot of the host computer or installation of permanent files into local data storage devices 107. Example threads created by the protection program 110 are further discussed below with reference to FIG. 4.

Still referring to FIG. 3, the protection program 110 creates a first thread for periodically monitoring the existence of the portable USB storage device 200 in the USB port 114 (309). When the first thread detects that the storage device 200 is no longer plugged into the USB port 114 (e.g., when the user unplugs the storage device 200), the first thread initiates a termination of the protection program 110 (311) to free up memory space in the host computer. The protection program 110 also creates a user interface, such as a system tray entry in the Microsoft Windows™ operating system, to allow the user to manually perform an orderly shutdown of the protection program 110 and its components (310).

Figure 4:
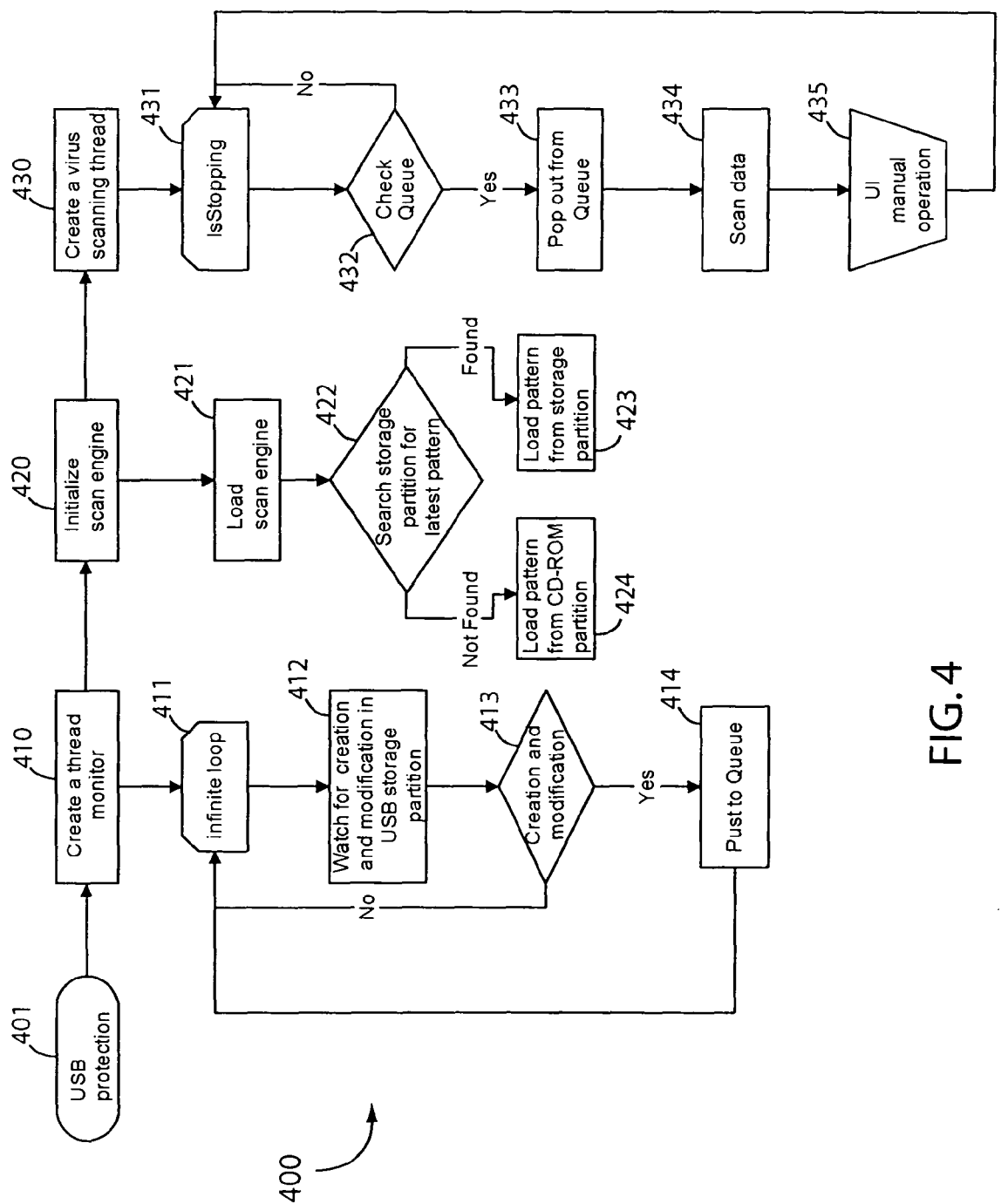
FIG. 4 shows a flow diagram illustrating protection of the portable USB storage device of FIG. 2A from viruses in accordance with an embodiment of the present invention.

FIG. 4 shows a flow diagram 400 illustrating protection of the portable USB storage device 200 from viruses in accordance with an embodiment of the present invention. Upon start up (401), the USB protection program 110 creates a second thread for monitoring data creation and modification activities in the regular storage partition 212 (and hidden partition 214, if implemented) (410), initializes the scan engine 280 (420), and creates a third thread for scanning data for viruses (430).

The second thread may include an infinite loop (411) that watches for data creation and modification in the regular storage partition 212 (and other portions of the storage device 200, if desired) (412). In one embodiment, the second thread uses the Win32 API ReadDirectoryChanges so that the operating system informs the second thread of any directory (and hence data) changes in the regular storage partition 212. If data has been created or modified in the regular storage partition 212 (413), the second thread pushes a scanning job into a scanning queue to initiate virus scanning of the modified or created data (414). Otherwise, the second thread continues monitoring for data creation and modification in the regular storage partition 212.

The initialization of the scan engine 280 results in the scan engine 280 being loaded into the memory 108 (421) and the pattern update manager 281 trying to obtain the most up to date version of patterns 270. The protection program 110 then searches the regular storage partition 212 for the latest patterns 270B (423) and, if found, loads the patterns 270B into the memory 108. If the regular storage partition 212 does not have the latest patterns 270B, the protection program 110 instead loads the patterns 270A from the CD-ROM partition 213 into the memory 108 (424). The scan engine 280 employs the patterns 270 (270A or 270B, whichever are more up to date) loaded into the memory 108 to scan data for viruses.

The third thread checks the scanning queue (432) for information on data to be scanned for viruses. The third thread periodically checks the queue until the user employs the user interface to perform an orderly shutdown of the protection program (435) or when the first thread (see 309 of FIG. 3) instructs shutdown of the protection program 110. In either case, the protection program 110 stops (431) and is deleted from the memory 108. If there is a scanning job in the scanning queue, the third thread pops the scanning job from the scanning queue (433), gets from the scanning job information about the data to be scanned for viruses, and instructs the scan engine 280 to scan the data for viruses (434). This prevents virus infected data from being transferred from the host computer to the storage device 200, even if the host computer does not have virus protection or has inadequate virus protection. In turn, this prevents the storage device from spreading viruses from one computer to another, which is a likely scenario because the storage device 200 is typically employed in more than one computer.

The just-described example USB protection program 110 only scans data in the portable USB storage device 200 and terminates when the storage device 200 is no longer plugged into the computer. That is, the example protection program 110 is exclusive to the storage device 200. This advantageously allows for a stand-alone, cost-effective, and minimally intrusive portable storage device.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A portable storage device comprising:
   a device interface configured to allow the portable storage device to be connected to a computer; and
   a non-volatile memory coupled to the device interface in the portable storage device, the non-volatile memory including a read-only partition and a regular storage partition, the read-only partition including a protection program for scanning data in the regular storage partition for viruses, the protection program being configured to be read from the read-only partition of the non-volatile memory for loading and running in a main memory of a computer upon coupling of the device interface into a peripheral port of the computer, the protection program being configured to search the regular storage partition of the non-volatile memory for latest patterns of computer viruses for loading into a memory of the computer, the protection program being configured to load another patterns of computer viruses from the read-only partition of the non-volatile memory into the memory of the computer when the regular storage partition of the non-volatile memory does not have the latest patterns of computer viruses, the protection program being configured to scan data in the regular partition of the non-volatile memory in response to detecting transfer of the data from the computer to the regular partition of the non-volatile memory.

2. The portable storage device of claim 1 wherein the protection program is further configured to stop running in the main memory of the computer when the portable storage device is unplugged from the computer.

3. The portable storage device of claim 1 wherein the non-volatile memory comprises flash memory.

4. The portable storage device of claim 1 wherein the device interface comprises a Universal Serial Bus (USB) interface.

5. The portable storage device of claim 1 further comprising patterns of computer viruses stored in the read-only partition.

6. The portable storage device of claim 1 further comprising patterns of computer viruses stored in a hidden partition of the non-volatile memory.

7. The portable storage device of claim 1 wherein the read-only partition appears as a CD-ROM partition to the operating system of the computer.

8. The portable storage device of claim 1 wherein the protection program is configured to scan for viruses only those data stored in the regular storage partition.

9. A computer-implemented method of protecting a portable storage device from viruses, the method comprising:
   a computer loading a virus scanning program from a read-only partition of a solid state memory of the portable storage device to a main memory of the computer upon insertion of the portable storage device to a peripheral port of the computer;
   the computer searching a regular storage partition of the solid state memory for latest virus patterns;
   the computer searching a local data storage of the computer for virus patterns compatible with the scanning program when the computer fails to find the latest virus patterns in the regular storage partition of the solid state memory;
   the computer detecting data transferred from the computer to the regular storage partition of the solid state memory;
   in response to detecting the data transferred from the computer to the regular storage partition of the solid state memory, the computer using the virus scanning program to scan the data for viruses in the regular storage partition of the solid state memory; and the computer writing the virus patterns compatible with the scanning program from the local data storage of the computer to the regular storage partition of the solid state memory.

10. The method of claim 9 further comprising:

terminating the virus scanning program from running in the main memory of the computer when the portable storage device has been unplugged from the computer.

11. The method of claim 9 further comprising:

loading virus patterns from the read-only partition of the solid state memory to the main memory of the computer.

12. A portable USB storage device comprising a memory, the memory including:

a CD-ROM partition comprising a USB protection program and an update program, the USB protection program being configured to be automatically loaded from the CD-ROM partition to a main memory of a computer upon plugging of the portable USB storage device to a USB port of the computer, the CD-ROM partition further comprising patterns of computer viruses to be used by the USB protection program when patterns of computer viruses in a regular storage partition of the portable USB storage device are not later than the patterns of computer viruses in the CD-ROM partition, the update program being configured to search for latest patterns of computer viruses it can find from outside the portable USB storage device for storage in the regular storage partition; and the regular storage partition for storing user data configured to be scanned by the USB protection program for viruses while the portable USB storage device is plugged to the USB port of the computer.

13. The portable USB storage device of claim 12 wherein the memory is a flash memory containing the CD-ROM partition and the regular storage partition.

14. The portable USB storage device of claim 12 wherein the memory further includes a hidden partition.

* * * * *